(12) United States Patent
Ma et al.

(10) Patent No.: US 11,504,955 B2
(45) Date of Patent: Nov. 22, 2022

(54) DECORATIVE LAMINATE WITH MATTE FINISH AND METHOD OF MANUFACTURE

(71) Applicant: WILSONART LLC, Temple, TX (US)

(72) Inventors: Muyuan M Ma, Austin, TX (US); Rajesh Ramamurthy, Temple, TX (US)

(73) Assignee: WILSONART LLC, Austin, TX (US)

( * ) Notice: Subject to any disclaimer, the term of this patent is extended or adjusted under 35 U.S.C. 154(b) by 626 days.

(21) Appl. No.: 15/680,679

(22) Filed: Aug. 18, 2017

(65) Prior Publication Data

US 2018/0050527 A1 Feb. 22, 2018

Related U.S. Application Data (60) Provisional application No. 62/377,017, filed on Aug. 19, 2016.

(51) Int. Cl.
*B32B 29/00* (2006.01)
*B32B 33/00* (2006.01)
(Continued)

(52) U.S. Cl.
CPC ............ *B32B 29/002* (2013.01); *B32B 33/00* (2013.01); *B32B 37/26* (2013.01); *B32B 38/06* (2013.01); *B32B 2037/268* (2013.01); *B32B 2307/408* (2013.01); *B32B 2419/00* (2013.01); *B32B 2479/00* (2013.01)

(58) Field of Classification Search
CPC ......... B32B 29/02; B32B 27/26; B32B 33/00; B32B 38/06; B32B 2419/00; B32B 2479/00; B32B 2037/268; B32B 2307/408; Y10T 156/1041; Y10T 428/24355; B44C 1/24; B44C 5/0469; B29C 59/02

See application file for complete search history.

(56) References Cited

U.S. PATENT DOCUMENTS 3,859,110 A  1/1975 Foster
3,935,330 A  1/1976 Smith
(Continued)

FOREIGN PATENT DOCUMENTS

CA  2050616 A1  3/1992
CN  1129023 A  8/1996
(Continued)

OTHER PUBLICATIONS

Basu et al., Mechanism of wrinkle formation in curing coatings, May 2005, Progress in Organic Coatings, vol. 53, Issue 1 (Year: 2005).
(Continued)

*Primary Examiner* — Laura A Auer
(74) *Attorney, Agent, or Firm* — Welsh Flaxman & Gitler LLC (57) ABSTRACT

A decorative laminate lay-up includes a decorative laminate sheet assembly composed of an exterior overlay paper layer, a decorative layer, and a core layer. The decorative laminate lay-up includes a texture imparting member in the form of a textured release sheet including a top side and a bottom side. The textured release sheet includes a textured matte surface formed on the bottom side thereof and ultimately applied the textured matte surface to a resulting decorative laminate.

3 Claims, 6 Drawing Sheets

(51) Int. Cl.
*B32B 38/06* (2006.01)
*B32B 37/26* (2006.01)

(56) References Cited

U.S. PATENT DOCUMENTS

| | | | |
|---|---|---|---|
| 4,169,167 A | 9/1979 | McDowell | |
| 4,284,453 A | 8/1981 | Endrizzi | |
| 4,311,766 A | 1/1982 | Mattor | |
| 4,327,121 A | 4/1982 | Gray, III | |
| 4,367,110 A | 1/1983 | Koshikawa | |
| 4,396,448 A | 8/1983 | Ohta | |
| 4,411,931 A | 10/1983 | Duong | |
| 4,427,732 A | 1/1984 | Gray, III et al. | |
| 4,789,604 A | 12/1988 | Van Der Hoeven | |
| 4,801,495 A | 1/1989 | Van Der Hoeven | |
| 4,927,572 A | 5/1990 | Van Der Hoeven | |
| 5,453,464 A | 9/1995 | Witzeman et al. | |
| 5,888,617 A | 3/1999 | Roth | |
| 5,976,304 A | 11/1999 | Horvath et al. | |
| 6,001,893 A | 12/1999 | Vaidya et al. | |
| 6,162,842 A | 12/2000 | Freche | |
| 6,333,076 B1 | 12/2001 | Sigel | |
| 6,340,504 B1 | 1/2002 | Neumann et al. | |
| 6,383,644 B2 | 5/2002 | Fuchs | |
| 6,423,167 B1 | 7/2002 | Palmer et al. | |
| 6,447,836 B1 | 9/2002 | Schrof | |
| 6,663,952 B1 | 12/2003 | Mehnert | |
| 6,767,980 B2 | 7/2004 | Yurugi et al. | |
| 7,160,605 B2 | 1/2007 | Fusco | |
| 8,568,849 B2 | 10/2013 | Shi et al. | |
| 9,511,570 B2 | 12/2016 | Nakagawa et al. | |
| 9,707,740 B2 | 7/2017 | Arai | |
| 9,707,746 B2 | 7/2017 | McGuire, Jr. | |
| 9,739,067 B2 | 8/2017 | Zhang | |
| 9,809,013 B2 | 11/2017 | Haller et al. | |
| 2001/0038910 A1 | 11/2001 | MacQueen | |
| 2001/0046590 A1 | 11/2001 | Benton et al. | |
| 2002/0110647 A1 | 8/2002 | Gust | |
| 2003/0003257 A1 | 1/2003 | Kendall | |
| 2004/0089409 A1 | 5/2004 | Kendall et al. | |
| 2005/0208275 A1 | 9/2005 | Abe | |
| 2006/0042492 A1 | 3/2006 | Garitano | |
| 2006/0204729 A1 | 9/2006 | Kobayashi | |
| 2007/0202301 A1 | 8/2007 | Taniwaki et al. | |
| 2007/0231551 A1 | 10/2007 | Hama | |
| 2008/0057276 A1 | 3/2008 | Rasmusson et al. | |
| 2008/0057300 A1 | 3/2008 | Paiva et al. | |
| 2008/0102271 A1 | 5/2008 | Bilodeau | |
| 2008/0292875 A1 | 11/2008 | Van De Wall | |
| 2009/0047480 A1 | 2/2009 | Juers | |
| 2009/0151866 A1 | 6/2009 | Endert | |
| 2010/0215911 A1 | 8/2010 | Shina | |
| 2011/0024938 A1 | 2/2011 | Tripp | |
| 2011/0042000 A1 | 2/2011 | Wilde et al. | |
| 2011/0052880 A1 | 3/2011 | Iizuka | |
| 2011/0143071 A1 | 6/2011 | Jung | |
| 2011/0151208 A1 | 6/2011 | Huang | |
| 2012/0141733 A1 | 6/2012 | Crosby | |
| 2012/0213973 A1 | 8/2012 | Clement | |
| 2012/0231223 A1 | 9/2012 | Lee | |
| 2013/0062005 A1 | 3/2013 | Iizuka | |
| 2013/0115420 A1 | 5/2013 | Park et al. | |
| 2013/0129980 A1 | 5/2013 | Meinhard | |
| 2013/0230712 A1 | 9/2013 | Kifuku | |
| 2013/0266759 A1 | 10/2013 | Kim et al. | |
| 2014/0186610 A1 | 7/2014 | Pervan | |
| 2014/0242316 A1 | 8/2014 | Shih et al. | |
| 2014/0242871 A1 | 8/2014 | Yasui et al. | |
| 2014/0371384 A1 | 12/2014 | Fischer et al. | |
| 2015/0191042 A1* | 7/2015 | Ma | B32B 37/18 |
| | | | 428/141 |
| 2015/0191043 A1 | 7/2015 | Ma et al. | |
| 2015/0290910 A1 | 10/2015 | Haller | |
| 2015/0354132 A1 | 12/2015 | Schweers | |
| 2016/0017167 A1 | 1/2016 | Magnusson et al. | |
| 2016/0153190 A1 | 6/2016 | Doehring | |
| 2016/0200092 A1 | 7/2016 | Doehring | |
| 2016/0375666 A1 | 12/2016 | Free | |
| 2017/0197459 A1 | 7/2017 | Gourdin | |
| 2017/0210839 A1 | 7/2017 | Lorenz et al. | |
| 2018/0001696 A1 | 1/2018 | Greyer | |
| 2018/0015691 A1 | 1/2018 | Nagasaki et al. | |
| 2018/0015776 A1 | 1/2018 | Wloczysiak et al. | |
| 2019/0381821 A1 | 12/2019 | Schmidt | |

FOREIGN PATENT DOCUMENTS

| | | |
|---|---|---|
| DE | 102006042063 A1 | 3/2008 |
| DE | 102006053662 A1 | 5/2008 |
| DE | 102008024149 A1 | 12/2009 |
| DE | 102008060906 A1 | 6/2010 |
| EP | 0030285 A2 | 6/1981 |
| EP | 0210620 A2 | 2/1987 |
| EP | 0287216 A1 | 10/1988 |
| EP | 0474470 A2 | 3/1992 |
| EP | 0706834 A1 | 4/1996 |
| EP | 1304236 A | 4/2003 |
| EP | 2857221 A1 | 4/2015 |
| EP | 2527408 | 7/2015 |
| EP | 2920232 | 1/2017 |
| JP | S57170718 A | 10/1982 |
| JP | 62085926 A | 4/1987 |
| JP | S63307945 A | 12/1988 |
| JP | 02231116 A | 9/1990 |
| JP | 03275316 A | 12/1991 |
| JP | 05092696 A | 4/1993 |
| JP | 05269931 A | 10/1993 |
| JP | H10180758 A | 7/1998 |
| JP | H11268192 A | 10/1999 |
| JP | 3789694 B2 | 6/2006 |
| JP | 2008173774 A | 7/2008 |
| JP | 2011136510 A | 7/2011 |
| JP | 4978226 B2 | 7/2012 |
| JP | 2017128634 A | 7/2017 |
| JP | 2017171794 A | 9/2017 |
| KR | 20080092591 A | 10/2008 |
| KR | 101317063 B1 | 10/2013 |
| KR | 20180010635 A | 1/2018 |
| WO | 8806973 A1 | 9/1988 |
| WO | 9856990 A1 | 12/1998 |
| WO | 2007068322 A1 | 6/2007 |
| WO | 2012122206 A1 | 9/2012 |
| WO | WO 2013/057214 | 4/2013 |
| WO | 2013133862 A1 | 9/2013 |
| WO | 2013154695 A2 | 10/2013 |
| WO | 2014003389 A | 1/2014 |
| WO | WO 2014/003389 | 1/2014 |
| WO | 2014075804 A | 5/2014 |
| WO | WO 2014/075804 | 5/2014 |
| WO | 2017076901 A2 | 5/2017 |
| WO | 2018096033 A1 | 5/2018 |
| WO | 2019034675 A1 | 2/2019 |

OTHER PUBLICATIONS

Schubert et al., VUV-induced micro-folding of acrylate-based coatings: 1. Real-time methods for the determination of the micro-folding kinetics, Mar. 2009, Surface and Coatings Technology, vol. 203, Issue 13 (Year: 2009).

Schubert et al., VUV-induced micro-folding of acrylate-based coatings: 2. Characterization of surface properties, Sep. 2009, Surface and Coatings Technology, vol. 203, Issue 24 (Year: 2009).

Bauer et al., UV curing and matting of acrylate nanocomposite coatings by 172 nm excimer irradiation Part 2, Nov. 2010, Progress in Organic Coatings, vol. 69, Issue 3 (Year: 2010).

Gan et al., Self-wrinkling induced by the photopolymerization and self-assembly of fluorinated polymer at air/liquid interface, Sep 2014, Journal of Materials Chemistry A, vol. 2 (Year: 2014).

Klick et al., Excimer Laser Curing of Polymer Coatings, Dec. 1988, Proceedings SPIE, vol. 0998, Excimer beam applications (Year: 1998).

(56) References Cited

OTHER PUBLICATIONS

Bohm et al., Surface treatment of components by the use of lasers to increase the wettability and to improve the adhesion, Jan. 2002 (Year: 2002).

Zenkiewicz, Abstract for Effects of electron-beam irradiation on wettability and surface free energy of a polypropylene film, Jan. 2005, International Journal of Adhesion and Adhesives, vol. 25, Issue 1, pp. 61-66 (Year: 2005).

Ali El-Saftawy, Studying electron-beam-irradiated PET surface wetting and free energy, Feb. 2014, Nuclear Instruments and Methods in Physics Research Section B Beam Interactions with Materials and Atoms, vol. 322, pp. 48-53 (Year 2014).

\* cited by examiner

DECORATIVE LAMINATE WITH MATTE FINISH AND METHOD OF MANUFACTURE

CROSS REFERENCE TO RELATED APPLICATION

This application claims the benefit of U.S. patent application Ser. No. 62/377,017, entitled "DECORATIVE LAMINATE WITH MATTE FINISH AND METHOD OF MANUFACTURE," filed Aug. 19, 2016.

BACKGROUND OF THE INVENTION

1. Field of the Invention

The present invention generally relates to decorative laminates. More particularly, the invention relates to a method for producing decorative laminates having a textured matte surface exhibiting a fingerprint proof surface, that is, a surface not showing fingerprints and remaining clean and clear despite regular use.

2. Description of the Related Art

High pressure decorative laminates are currently manufactured with smooth glossy surfaces, textured surfaces, or deeply sculpted and embossed surfaces. As general background, decorative laminates prepared by heat and pressure consolidation have been produced commercially for a number of years, and have found widespread acceptance in the building and furniture industry as counter and tabletops, bathroom and kitchen work surfaces, wall paneling, flooring products, partitions and doors. These decorative laminates may be described as containing a number of laminae consolidated to form a unitary structure carrying a surface decoration. The surface decoration may range from something as simple as a solid color to something as complex as an embossed simulated wood grain finish.

Decorative laminates generally include plural layers of synthetic resin impregnated paper sheets bonded under heat and pressure to form a unitary structure. In normal practice, a decorative laminate sheet assembly, from the bottom up, includes a core of one or more phenolic resin impregnated sheets, above which lies a decorative melamine impregnated sheet. The decorative sheet may be further covered with a melamine impregnated overlay. The core, or base, functions to impart rigidity to the decorative laminate and usually includes a solid substrate which may, or may not, be formed prior to the initial laminating steps. Prior to stacking, the sheets of the core member are impregnated with a water alcohol solution of phenol formaldehyde, dried and partially cured in a hot oven, and finally cut into shapes.

The core may, for example, include a plurality of sheets of 90-150 pound phenolic resin impregnated Kraft paper and a substrate. The Kraft paper is impregnated throughout and bonded with a substantially completely cured phenolic resin which has been converted to a thermoset state during the initial laminating step. The substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

The decorative sheet provides the decorative laminate with an attractive appearance. The decorative sheet also dictates the surface characteristics of the decorative laminate. For example, the composition of the decorative sheet dictates the decorative laminate's resistance to chemical agents, heat, light, shock and abrasion. Decorative sheets are commonly manufactured from high quality 50-125 pounds per 3,000 feet ream basis weight (80-202 grams per square meter), pigment filled, alpha-cellulose paper impregnated with a water alcohol solution of melamine formaldehyde resin. The resin impregnated decorative sheets are subsequently dried, partially cured, and finally cut into sheets. The pigment filled, alpha-cellulose paper of the decorative sheet, may include a solid color, a decorative design, or a rotogravure reproduction of natural materials, such as, wood, marble, leather, etc. The aesthetic characteristics of the cellulose paper are revealed as the laminate's decorative design upon completion of the decorative laminate.

Decorative laminates are generally manufactured by placing the resin impregnated core and decorative sheet between steel plates and subjecting the decorative laminate stack to heat and pressure for a time sufficient to consolidate the laminate and cure the resins (generally about 25 minutes to an hour). The pressure and heat force the resin in the paper sheets to flow, cure and consolidate the sheets into a unitary laminated mass referred to in the art as a decorative high pressure laminate. Finally, the formed decorative laminate is bonded to a reinforcing substrate, such as, plywood, hardboard, asbestos board, particle board or the like.

Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

Textured decorative laminates are also very popular. The textured surfaces range from relatively shallow depressions, such as, textured (e.g., satin, matte or semi-gloss) surfaces, to relatively deeply sculpted or embossed surfaces having a noticeable three-dimensional effect, such as, wood grain, leather, slate, abstract patterns, creative designs etc. The textured laminates are commonly manufactured using release sheets with the desired surface texture, which surface texture is imparted to the decorative laminate during the application of heat and pressure in the manufacturing process.

It has, however, been found that high pressure decorative laminates are susceptible to a build-up of fingerprints as the surface of the high pressure decorative laminate is touched during the course of the day. The fingerprints remain visible and can become highly distracting. Prior attempts to address this problem have relied upon chemically modified surfaces to achieve the purpose. However, such attempts have only led to limited success. As such, a need remains for a high pressure decorative laminate that is not susceptible to a build-up of fingerprints on the surface thereof.

SUMMARY OF THE INVENTION

It is, therefore, an object of the present invention to provide a decorative laminate lay-up including a decorative laminate sheet assembly composed of an exterior overlay paper layer, a decorative layer, and a core layer. The decorative laminate lay-up includes a texture imparting member in the form of a textured release sheet including a top side and a bottom side. The textured release sheet includes a textured matte surface formed on the bottom side thereof and ultimately applied the textured matte surface to a resulting decorative laminate.

It is also an object of the present invention to provide a decorative laminate lay-up wherein the textured matte surface of the textured release sheet is a coating of an electron beam radiation curable material applied to bottom side of the textured release sheet.

It is another object of the present invention to provide a decorative laminate lay-up wherein the coating is an epoxy acrylic is laid upon a substrate of the textured release sheet. The epoxy acrylic is irradiated with monochromatic UV-radiation to produce a monochromatic UV-radiation layer wherein the epoxy acrylic is neither hardened nor is an entire layer of the epoxy acrylic crosslinked but rather the epoxy acrylic is only crosslinked on the surface thereof, which produces a matting surface through the effects of a microconvolution.

It is a further object of the present invention to provide a decorative laminate lay-up wherein the monochromatic UV-irradiated layer is then subjected to an electron beam irradiation to crosslink and harden the entire layer.

It is also an object of the present invention to provide a decorative laminate lay-up wherein the epoxy acrylic is applied to the substrate by a roller, with a layer thickness in the range between 5 and 30 microns.

It is another object of the present invention to provide a decorative laminate lay-up wherein the epoxy acrylic is applied to the substrate by a roller, with a layer thickness in the range between 10 and 20 microns.

It is a further object of the present invention to provide a decorative laminate manufactured by the process comprising assembling decorative laminate lay-up composed of a decorative laminate sheet assembly composed of an exterior overlay paper layer, a decorative layer, and a core layer, and a texture imparting member in the form of a textured release sheet including a top side and a bottom side. The textured release sheet including a textured matte surface formed on the bottom side thereof. The textured matte surface is applied to a resulting decorative laminate. The method also includes consolidating the decorative laminate lay-up under heat and pressure to form the decorative laminate exhibiting a matte surface.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
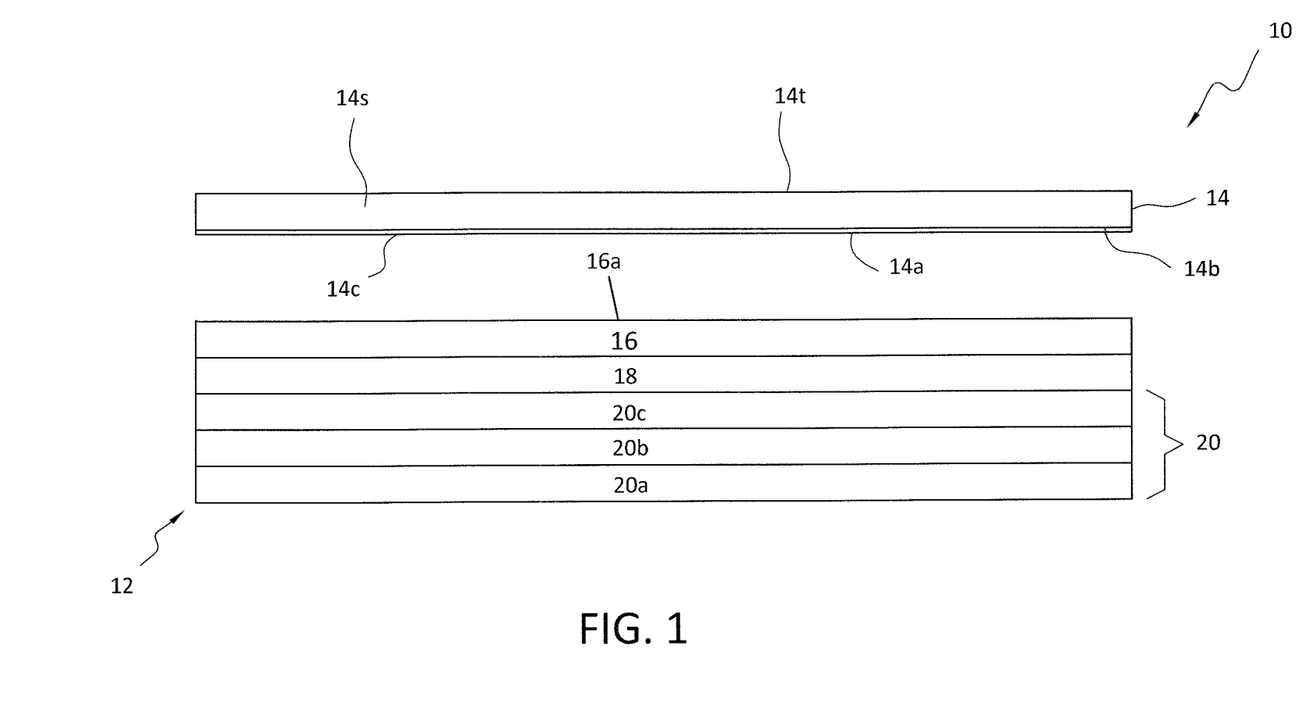
FIG. 1 is a schematic of a laminate lay-up in accordance with an embodiment of the present invention.
Figure 2:
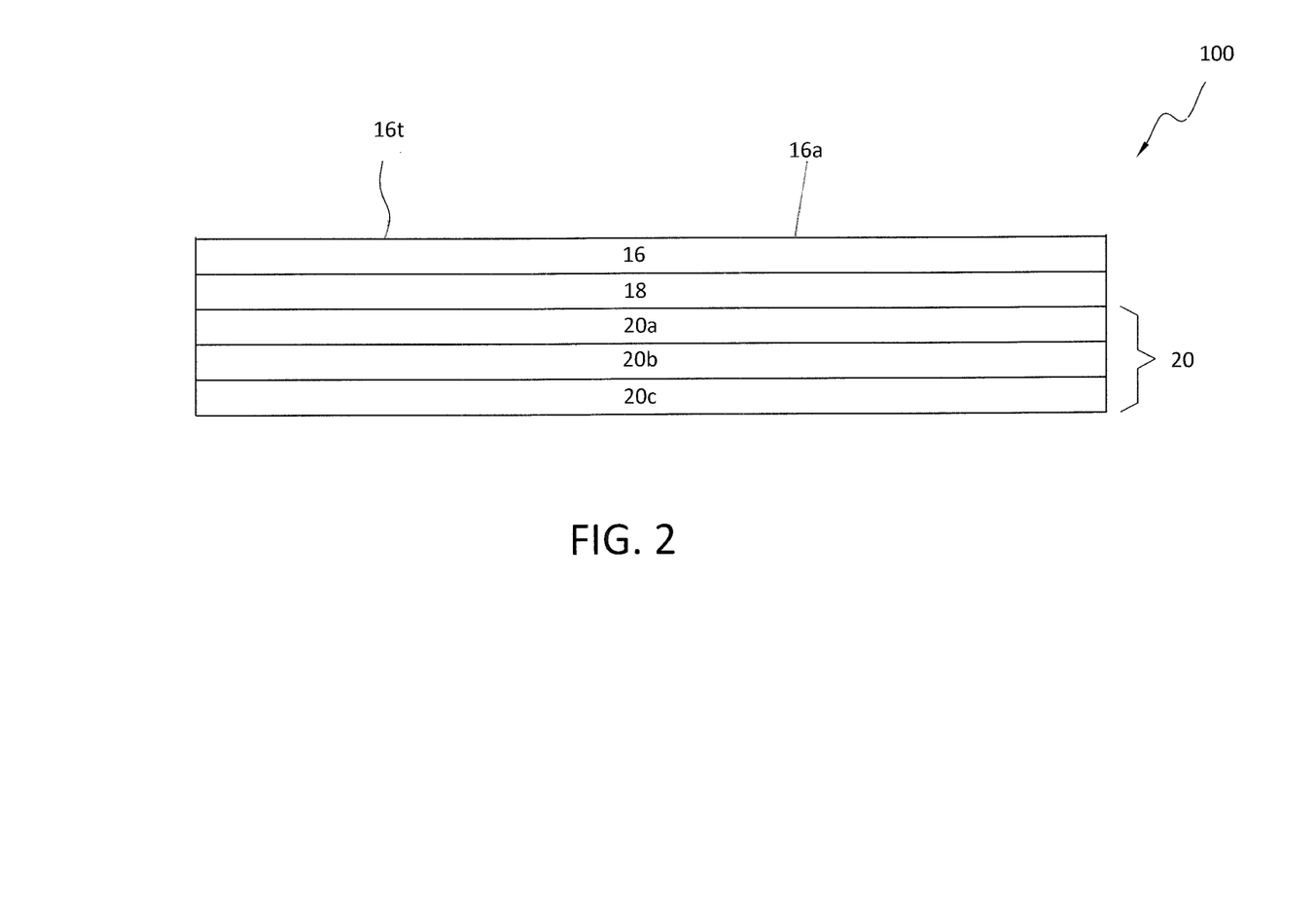
FIG. 2 is a schematic of a high pressure decorative laminate produced in accordance with the present invention.
Figure 3:
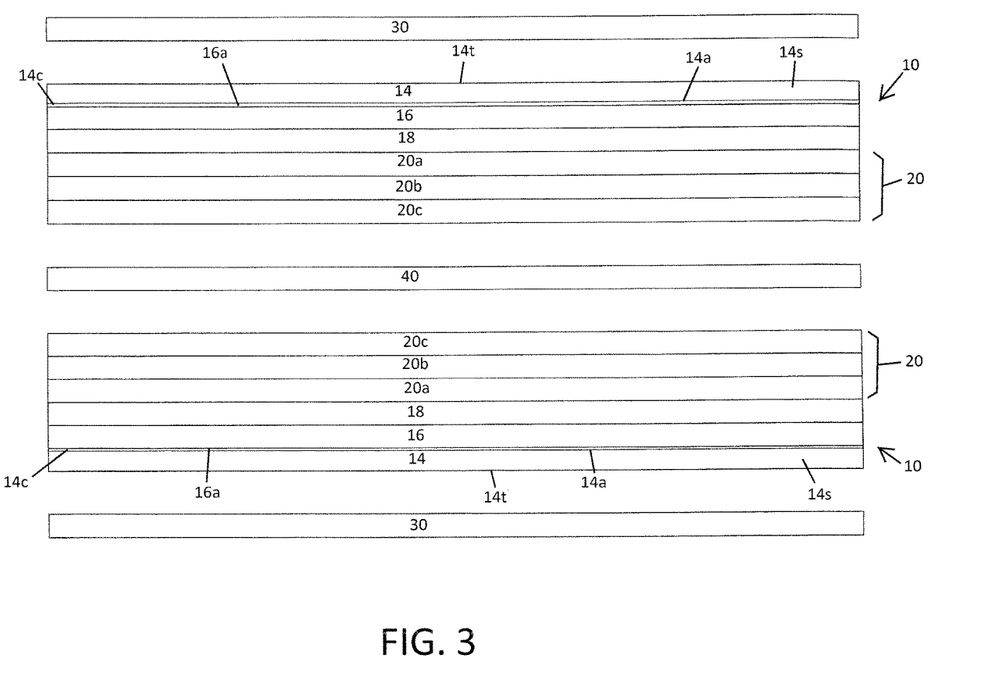
FIG. 3 is a schematic of a multi-laminate pressing assembly in accordance with the present invention.

With reference to FIGS. 1, 2 and 3, a decorative laminate lay-up 10 including a decorative laminate sheet assembly 12 (composed of an exterior overlay paper layer 16, a decorative layer 18, and a core layer 20 as discussed below in greater detail) and a texture imparting member in the form of a textured release sheet 14 (including a top side 14*t* and a bottom side 14*b*) is disclosed. As will be explained below in accordance with an alternate embodiment, the decorative laminate lay-up may be assembled without an overlay paper layer. The decorative laminate lay-up 10 is used in the manufacture of decorative laminates 100 (see FIG. 2) in accordance with the present invention. The textured release sheet 14 provides a textured matte surface 14*a* (formed on the bottom side 14*b* thereof) to a resulting decorative laminate 100, wherein the textured matte surface 14*a* of the textured release sheet 14 results in a decorative laminate 100 that exhibits a matte appearance and is not susceptible to a build-up of fingerprints on the surface thereof. It is further appreciated the release sheet 14 also functions as a release mechanism between decorative laminate sheet assemblies 12. With this in mind, the textured release sheets 14 of the present invention may be used in gang processing of decorative laminates 100 or the present textured release sheets 14 may be used in the manufacture of single laminate to simply impart a desired matte surface.

The decorative laminate lay-up 10 is assembled by first stacking a decorative laminate sheet assembly 12 having a top layer (which, as explained below, is preferably an overlay paper sheet 16). That is, the sheets used in the production of the decorative laminate 100 are stacked in preparation for the heating and pressure steps used to consolidate the laminate. A textured release sheet 14 composed of a substrate 14*s* and a textured coating layer 14*c* defining the textured matte surface 14*a* is also prepared.

The process for producing surface effects in a release coating as disclosed in European Patent Application Publication No. 2527408, entitled "Method for Producing a Film with a Matt Surface," which is incorporated herein by reference, is employed in the manufacture of textured release sheets 14 for use in accordance with the present invention. Briefly, the '408 publication teaches a technique for producing surface effects on a sheet. In accordance with the disclosed methodology a coating of an electron beam radiation curable material is applied to one surface of a web substrate, and subsequently cured (ultimately producing the textured coating layer 14*c* with the textured matte surface 14*a* in accordance with the present invention). The surface forming techniques of the '408 publication result in a film (or textured release sheet 14 in accordance with the present invention) with a textured matte surface 14*a*. The textured matte surface 14*a* exhibits good matting properties (and correspondingly low degrees of gloss as defined in and measured in accordance with DIN EN ISO 2813) having improved scratch resistance properties. Ultimately, and as will be explained below in greater detail, the film produced as a result of the manufacturing process disclosed in the '408 publication is ultimately utilized as a release sheet in the manufacture of decorative laminate.

The material produced in accordance with the '408 publication is sold under the name FENIX NTM™. FENIX NTM™ is described as a super opaque nanotech material that is an innovative interior design product, created by Arpa Industriale, that combines elegant aesthetic solutions with state-of-the-art technological performance. The external surface of FENIX NTM™ employs nanotechnology and is characterized by next generation acrylic resins, hardened and fixed with electron beam curing.

Figure 6A:
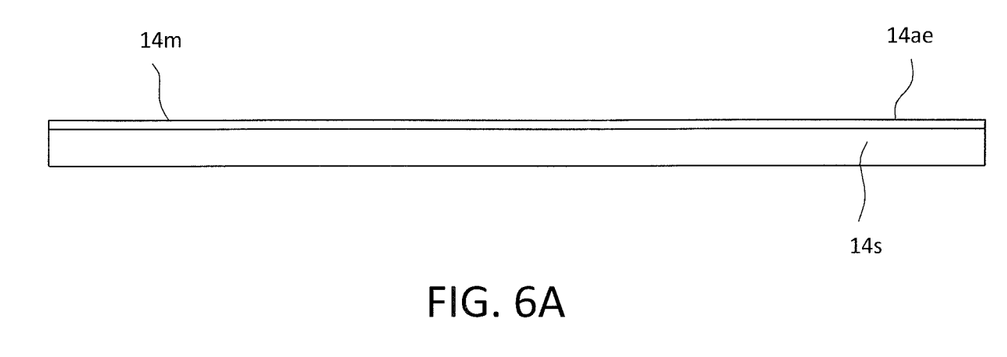
FIGS. 6A and 6B are schematics showing the fabrication of the release sheet in accordance with the present invention.

With reference to FIGS. 6A-6B, the release sheet 14 of the present invention, and as produced in accordance with the '408 publication, employs a solvent-free and non-aqueous lacquer (in accordance with the present invention the lacquer is preferably an epoxy acrylic) in the production of the textured coating layer 14c on the substrate 14s. The matte release sheet 14 employed in accordance with the present invention is produced through the implementation of a two-stage irradiation process. First, and with reference to FIG. 6A, the epoxy acrylic 14ea (which is ultimately cured to form the textured coating layer 14c) is laid upon the substrate 14s and is irradiated with monochromatic UV-radiation to a create monochromatic UV-irradiated layer 14m. However, the irradiation is applied so that epoxy acrylic 14ea is neither hardened nor is the entire layer of epoxy acrylic crosslinked. Rather the epoxy acrylic 14ea is only crosslinked on the surface thereof, which produces a matting surface through the effects of a micro-convolution.

Figure 6B:
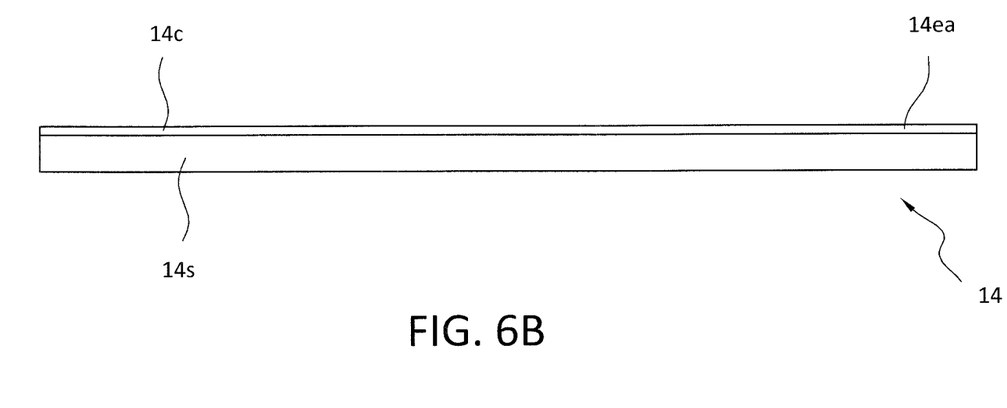

Referring to FIG. 6B, the monochromatic UV-irradiated layer (on the substrate 14s) is then subjected to an electron beam irradiation to crosslink and harden the entire layer and form the final textured coating layer 14c of the release sheet 14. In accordance with a preferred embodiment, the monochromatic UV-radiation irradiate at a wavelength of 172 nm. However, it is appreciated excimer emitter based on a Xe-emission spectrum is known, which might be particularly favorable for a large-scale production.

This procedure initially creates a shrinking process in the epoxy acrylic textured coating layer 14c and thus the desired matting directly on the surface of the resulting release sheet 14. The production of a textured matte surface 14a is achieved according to the '408 publication with 100% lacquers, to which no separate matting agent (such as silica or the like) were added. The curing and cross-linking of the total layer by means of electron beam irradiation fixes the matte surface created by the partial curing and irradiation without influencing the matte surface in any adverse manner. The matte release sheet 14 produced in this manner is distinguished by outstanding matting properties, which gloss levels to less than 3 (measured in accordance with the cited DIN EN ISO 2813 and 60° geometry) or less than 5 (corresponding at 85° geometry) can be reached.

In accordance with a preferred embodiment, the epoxy acrylic 14ea is preferably applied to the substrate 14s by a roller, with a layer thickness in the range between 5 and 30 microns, preferably in the range between 10 and 20 microns. The substrate 14s may be selected from various substrate plastic materials such as polypropylene, polyester the like, as well as films made of metal or paper material are contemplated. In accordance with a preferred embodiment, a plastic film substrate of polypropylene, layer thickness 150 microns, is coated by flexographic printing with an epoxy acrylic mixture to produce a coating thickness of 15 microns, wherein the acrylate mixture has the following composition as disclosed in the '408 publication:

| | |
|---|---|
| 100 T (Parts) | NeoRad ® U 6288 (a 100% UV curable resin, which can be used in coatings and overprint varnishes for luxury packaging and high end promotional printing. NeoRad ® U-6288 offers broad formulating latitude and high matte efficiency, working with most common matting agents. In particular, it is a UV curable urethane acrylate. It exhibits good adhesion, hardness, yellowing and improved flow. It has high matte efficiency, very good flexibility and excellent shrinkage. It also exhibits superior chemical- and abrasion-resistance.). |
| 10 T (Parts) | Ebecryl ® 5129 (a hexafunctional aliphatic urethane acrylate oligomer which provides fast cure response when exposed to ultraviolet light or electron beam. Cured films of Ebecryl ® 5129 exhibit high hardness, abrasion and solvent resistance combined with a good flexibility). |
| 40 T (Parts) | TiO$_2$ pigments |
| 10 T (Parts) | Matting agents | where NeoRad ® U 6288 is a mixture of oligomer and monomer.

The acrylate mixture is preferably Ebecryl®5129 added with a proportion of 5 to 10 weight percent of the total paint, and there are titanium dioxide pigments of an average particle size of 0.1 microns admixed as white pigmentation. Such a coated substrate is passed under an inert gas in a continuous (in-line) process under a 172 nm excimer emitter, typical feed 60 m/min at 0.5 cm distance from the coating surface. The result is a surface matting of gloss<4 (60° geometry, measured as before) which immediately thereafter an electron beam crosslinking (and hence hardening) of the paint with a record of 30 kGy was made.

With laminate sheet assembly 12 and the finished release sheet 14 prepared, the finished release sheet 14 is positioned on the top surface 16a (in the case of the present laminate sheet assembly 12 it is positioned on the upper surface of the overlay sheet 16) of the laminate sheet assembly 12 to form the laminate lay-up 10. The release sheet 14 is positioned on the overlay sheet 16 with the bottom side 14b (that is, the textured matte surface 14a) of the release sheet 14 facing the top surface 16a of the overlay sheet 16.

Heat and pressure are then applied to the laminate sheet assembly 12 and the textured release sheet 14 using conventional techniques. The heat and pressure are applied in manner sufficient to bond the layers of the decorative laminate sheet assembly 12, and releasably bond the textured release sheet 14 (in particular, the bottom side 14b with the textured matte surface 14a) to the top surface 16a of the decorative laminate sheet assembly 12. Finally, the textured release sheet 14 is removed from the top layer 16a of the formed decorative laminate 100 to reveal a decorative laminate 100 exhibiting desired matte texture characteristics.

In accordance with the present invention, and as discussed above, the release sheet 14 is formed with a textured matte surface 14a on the bottom side 14b thereof (the texture of which is ultimately applied to the top surface 16a of the decorative laminate 100) exhibiting matte surface characteristics leading to a fingerprint proof surface, that is, a surface not showing fingerprints and remaining clean and clear despite regular use. The release sheet 14 is preferably an acrylic coated polypropylene sheet, the acrylic coating of which is applied in accordance with the procedure disclosed in the '408 publication.

The texture of the textured matte surface 14a applied to the release sheet 14 is ultimately applied to the top surface 16a of the resulting decorative laminate 100 as texture 16t resulting in a textured top surface 16a of the resulting decorative laminate 100) with a matte surface. When the textured matte surface 14a (that is, the texture) of the release sheet 14 is applied to the decorative laminate 100 as discussed below in greater detail, the top surface 16a of the decorative laminate 100 is imparted with a texture 16t (that is, the decorative laminate 100 is provided with a textured surface) the same as the texture of the textured matte surface 14*a* of the release sheet 14 making the laminate 100 less susceptible to the formation of annoying and undesirable fingerprints thereon.

Summarizing, when such texture 16*t* is applied to the top surface 16*a* (this reference numeral is used for each of the embodiments disclosed below) of the decorative laminates 100 so as to provide for a textured top surface, the resulting characteristics result in the formation of a laminate not susceptible to the formation of annoying and undesirable fingerprints.

As the textured matte surface 14*a* of the release sheet 14 is ultimately imparted to the top layer (that is, the texture 16*t* of the top surface 16*a* of the overlay paper layer 16 in accordance with the present invention) of the decorative laminate 100 formed using the textured release sheet 14, the resulting decorative laminate 100 is provided with a top surface 16*a* having texture 16*t* that is the same as that of the textured surface and will exhibit desired resistance to the formation of fingerprints. In accordance with one embodiment of the present invention, and as discussed above, the decorative laminate includes an overlay layer sheet 16, or top layer, a decorative sheet 18 and a core 20.

More particularly, and as will be described in greater detail below, the decorative laminate 100 includes an exterior overlay paper layer 16, a decorative layer 18, and a core layer 20. While a specific layering pattern is disclosed in accordance with a preferred embodiment of the present invention, the layering pattern may be varied, somewhat, without departing from the spirit of the present invention.

The overlay paper layer 16 is preferably a melamine impregnated paper layer. The overlay paper layer 16 is preferably manufactured from a low basis weight transparent sheet impregnated with resin, for example, melamine. The resin impregnated overlay paper layer 16 is subsequently dried, partially cured and finally cut into sheets. In accordance with a preferred embodiment, the overlay paper layer 16 is B-stage cured and is then coated with a UV curable epoxy acrylic film that is also partially cured. While the paper may exhibit opaque properties prior to heating and pressing, the overlay paper layer in the final fabricated laminate is preferably transparent to permit viewing of the decorative sheet 18 positioned directly beneath the overlay paper layer 16. The overlay paper used in accordance with the present invention is a low weight basis alpha-cellulose paper with a high porosity for resin absorption. The decorative layer 18 is a conventional pattern sheet positioned directly beneath the overlay paper layer 16. When the decorative laminate 100 is fully heated and pressed, as will be discussed below in greater detail, the overlay paper layer 16 becomes translucent, fully exposing the decorative layer 18. In addition, it is the top surface 16*a* of the overlay paper layer 16 which takes on the texture 16*t* imparted by the release sheet 14. With this in mind, the decorative layer 18 is substantially responsible for the aesthetic appearance of the finished decorative laminate 100.

Decorative layers 18 are chosen from a wide array of sheets. For example, the decorative layer 18 may be a solid color (for example, white) or include an aesthetically appealing pattern. As discussed above, the decorative layer 18 provides the decorative laminate 100 with an attractive appearance. The overlay paper layer 16 and the decorative layer 18 also dictate the surface characteristics of the final decorative laminate 100. For example, the composition of the overlay paper layer 16 and decorative layer 18 help to dictate the decorative laminate's resistance to chemical agents, heat, light, shock and abrasion.

Decorative sheets 18 are commonly manufactured from high quality 80-202 grams/m$^2$ ream weight, pigment filled, alpha cellulose paper impregnated with a water alcohol or water solution of melamine-formaldehyde resin. The resin impregnated decorative sheets 18 are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

The core layer 20 is preferably a plurality of phenolic resin impregnated sheets 20*a*, 20*b*, 20*c*, although other materials may be used without departing from the spirit of the present invention. For example, the core layer 20 includes sheets of 120-323 grams per square meter dry phenolic resin impregnated Kraft paper. The Kraft paper is impregnated throughout and bonded with a substantially cured phenolic resin which has been converted to a thermoset state during the initial laminating step.

In accordance with the present invention, the decorative laminate 100 of the present invention is formed in much the same manner as conventional decorative laminates. The layers are first stacked and placed between steel plates with the release sheet 14 covering the overlay paper layer 16. The decorative laminate lay-up (or stack) 10 is then subjected to temperatures in the range of 121° C.-160° C. and pressures of about 56.24 kg/cm$^2$ to 112.48 kg/cm$^2$ for a time sufficient to consolidate the laminate and cure the resins (generally about 25 minutes to an hour).

The pressure and heat force the resin in the paper sheets to flow, cure and consolidate the sheets into a unitary laminated mass referred to in the art as a decorative high pressure laminate 100 having the hydrophobic textured surface 16*t* as described above which is imparted by the textured matte surface 14*a* of the release sheet 14. Generally, more than one decorative laminate is formed at one time. As shown with reference to FIG. 3, multiple decorative laminates are formed by inserting a plurality of lay-ups 10 in a stack. Conventional sheets 40 are positioned between the core lays 20 of the lay-ups 10 to separate the various decorative laminates stacked together. The textured matte surface 14*a* of the release sheet 14 is oriented against the top surface 16*a* (in this case the upper surface of the overlay paper layer 16) of the decorative laminate sheet assembly 12, be it the decorative sheet 18 (as discussed below with reference to an alternate embodiment) or overlay paper layer 16, with the smooth top side (or back surface) 14*t* of the textured release sheet 14 positioned against the steel plate 30. A standard release sheet 40 is positioned between the adjacent lay-ups 10. Upon pressing between suitable laminate press plates, the textured release sheet 14 imparts the matte texture 16*t* described above to the top surface 16*a* of the first lay-up layer (in this case the upper surface of overlay paper layer 16 creating the textured surface 16*t* discussed above), and serves to allow release between the first lay-up and the adjacent lay-up. A platen press assembly, as is well known in the lamination art, provides the necessary heat and/or pressure during lamination. After consolidation, the release sheets allow the individual decorative laminates to be separated.

As discussed above, and with reference to FIGS. 4 and 5, the decorative laminate 100 of the present invention may be manufactured without the overlay. The decorative laminate 100 is manufactured with the formation of a decorative laminate lay-up 10 including a decorative laminate sheet assembly 12 composed of a decorative layer 18 and a core layer 20. The decorative layer 18 and core layer 20 are the same as discussed with regard to the embodiments disclosed with reference to FIGS. 1 to 3. The manufacture of the decorative laminate also requires a texture imparting member in the form of a textured release sheet 14 (including a top side 14t and a bottom side 14b) as discussed above with regard to the embodiment disclosed with reference to FIGS. 1 to 3. Briefly, and as discussed above in detail, the textured release sheet 14 includes a textured matte surface 14a (formed on the bottom side 14b thereof) and applies the textured matte surface 14a to a resulting decorative laminate 100, wherein the textured matte surface 14a imparts the matte texture 189 in a decorative laminate 100 that exhibits the matte appearance and is not susceptible to a build-up of fingerprints on the surface thereof. The release sheet 14 also functions as a release sheet between decorative laminate sheet assemblies 12.

Figure 4:
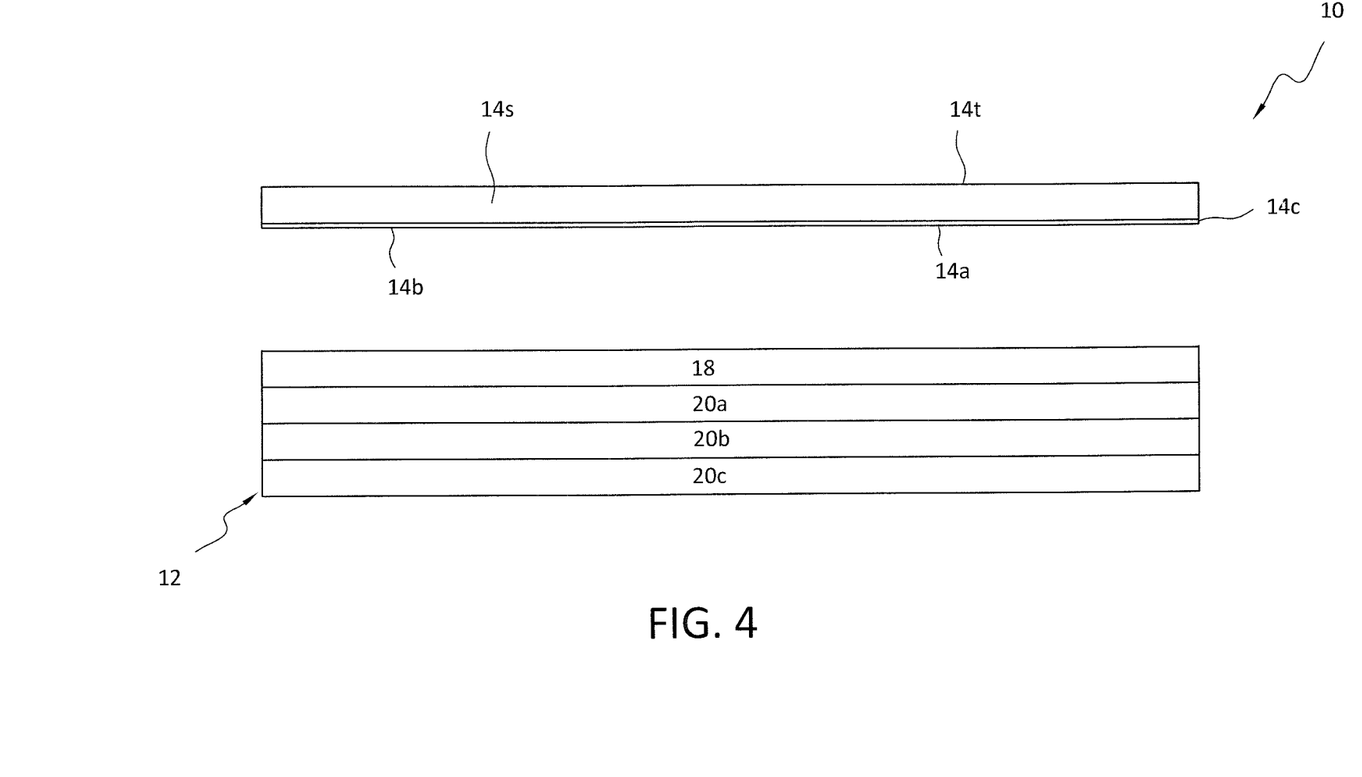
FIG. 4 is a schematic of a laminate lay-up in accordance with an alternate embodiment.

The decorative laminate lay-up 10 is assembled by first stacking a decorative laminate sheet assembly 12 having a top layer (which, as explained below, is preferably the decorative layer 18). The textured release sheet 14 is also prepared.

Figure 5:
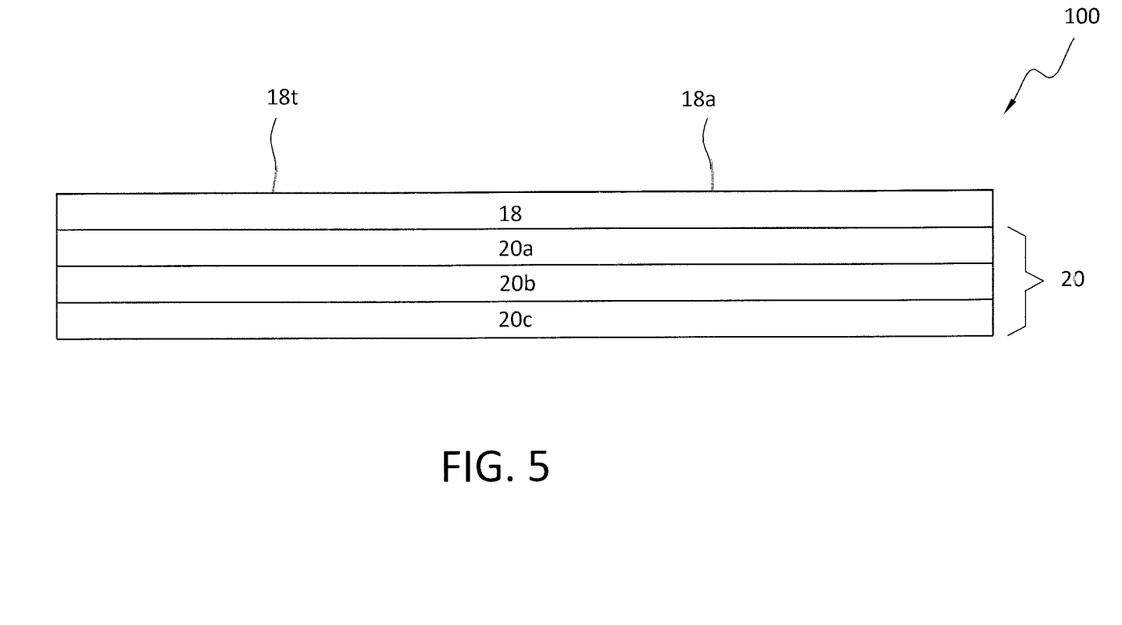
FIG. 5 is a schematic of a high pressure decorative laminate in accordance with the alternate embodiment disclosed with reference to FIG. 4.

In practice, the finished release sheet 14 is positioned on the top surface 16a (in the case of the present laminate sheet assembly 12 it is positioned on the upper surface of the decorative layer 18) of the laminate sheet assembly 12 to form the laminate lay-up 10. The release sheet 14 is positioned on the decorative layer 18 with the bottom side 14b (that is, the textured matte surface 14a) of the release sheet 14 facing the top surface 18a of the decorative layer 18. Heat and pressure are then applied to the laminate sheet assembly 12 and the textured release sheet 14 sufficient to bond the layers of the decorative laminate sheet assembly 12, and releasably bond the textured release sheet 14 (in particular, the bottom side 14b with the textured matte surface 14a) to the top surface 18a of the decorative laminate sheet assembly 12. Finally, the textured release sheet 14 is removed from the top layer 18a of the formed decorative laminate 100 to reveal a decorative laminate 100 exhibiting desired matte texture characteristics.

In accordance with the present invention, and as discussed above, the release sheet 14 is formed with a textured matte surface 14a on the bottom side 14b thereof (the texture of which is ultimately applied to the top surface 18a of the decorative laminate 100) exhibiting matte surface characteristics leading to a fingerprint proof surface, that is, a surface not showing fingerprints and remaining clean and clear despite regular use.

The texture of the textured matte surface 14a applied to the release sheet 14 is ultimately applied to the top surface 18a of the resulting decorative laminate 100 as texture 18t resulting in a textured top surface 18a of the resulting decorative laminate 100 with a matte surface. When the textured matte surface 14a (that is, the texture) of the release sheet 14 is applied to the decorative laminate 100, the top surface 18a of the decorative laminate 100 is imparted with a texture 18t (that is, the decorative laminate 100 is provided with a textured surface) that is the same as the texture of the textured matte surface 14a of the release sheet making the laminate 100 less susceptible to the formation of annoying and undesirable fingerprints thereon.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A decorative laminate lay-up for the manufacture of a high pressure decorative laminate, comprising:
 a decorative laminate sheet assembly comprising an exterior overlay paper layer including a resin impregnated overlay paper coated with a UV curable epoxy acrylic film that is partially cured, a decorative layer including a resin impregnated decorative paper, and a core layer including resin impregnated Kraft paper; and
 a texture imparting textured release sheet including a substrate, a coating applied to the substrate, a top side, a bottom side, and a textured matte surface formed on the bottom side thereof for applying the textured matte surface to a resulting decorative laminate, wherein the textured matte surface of the textured release sheet is an exposed surface of the coating and the coating is an electron beam radiation curable material applied to the bottom side of the textured release sheet, the coating being an epoxy acrylic laid upon the substrate of the textured release sheet, wherein the epoxy acrylic is irradiated with monochromatic UV-radiation to produce a monochromatic UV-radiation layer, and the epoxy acrylic is neither hardened nor is an entire layer of the epoxy acrylic crosslinked but rather the epoxy acrylic is only crosslinked on the surface thereof, which produces a matting surface through the effects of a micro-convolution, and the monochromatic UV-irradiated layer is then subjected to an electron beam irradiation to crosslink and harden the entire layer.

2. The decorative laminate lay-up according claim 1, wherein the epoxy acrylic is applied to the substrate by a roller, with a layer thickness in the range between 5 and 30 microns.

3. The decorative laminate lay-up according claim 2, wherein the epoxy acrylic is applied to the substrate by a roller, with a layer thickness in the range between 10 and 20 microns.

* * * * *